United States Patent
Hirano et al.

(10) Patent No.: US 10,525,826 B2
(45) Date of Patent: Jan. 7, 2020

(54) FUEL TANK FOR SADDLED VEHICLE

(71) Applicant: HONDA MOTOR CO., LTD., Tokyo (JP)

(72) Inventors: Kohei Hirano, Wako (JP); Motoaki Takashima, Tokyo (JP); Ryuji Masuda, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 108 days.

(21) Appl. No.: 15/671,375

(22) Filed: Aug. 8, 2017

(65) Prior Publication Data

US 2018/0043770 A1 Feb. 15, 2018

(30) Foreign Application Priority Data

Aug. 9, 2016 (JP) .................. 2016-156680

(51) Int. Cl.
*B60K 15/07* (2006.01)
*F02M 37/50* (2019.01)
(Continued)

(52) U.S. Cl.
CPC ............. *B60K 15/07* (2013.01); *B62J 35/00* (2013.01); *B62J 37/00* (2013.01); *B62K 11/06* (2013.01);
(Continued)

(58) Field of Classification Search
CPC .......... B60K 15/07; B62J 35/00; B62J 37/00; B62K 11/06; F02M 37/50; F02M 37/0017;
(Continued)

(56) References Cited

U.S. PATENT DOCUMENTS

| 4,449,723 | A | * | 5/1984 | Shiratsuchi | .............. | B62J 35/00 180/219 |
| 6,145,691 | A | * | 11/2000 | Inaoka | .................. | B60K 15/03 220/4.14 |

(Continued)

FOREIGN PATENT DOCUMENTS

| EP | 2853474 A1 | 4/2015 |
| JP | 2008-201171 A | 9/2008 |

(Continued)

OTHER PUBLICATIONS

Extended European Search Report for European Application No. 17185476.3, dated Dec. 22, 2017.

*Primary Examiner* — Joseph M Rocca
*Assistant Examiner* — Michael R Stabley
(74) *Attorney, Agent, or Firm* — Birch, Stewart, Kolasch & Birch, LLP

(57) ABSTRACT

An upper half body flange is disposed over a whole circumference of a lower end portion of an upper half body along a plane and a lower half body flange is disposed over a whole circumference of an upper end portion of a lower half body along the plane. The upper half body and the lower half body are made of titanium material, and the upper half body flange and the lower half body flange have linear outer edges as straight line portions. The upper half body has a side surface, the lower half body has a side surface, and the side surface and the side surface include recesses and convex portions. The recesses and the convex portions are disposed within a range of lengths of the straight line portions when viewed from above in the direction perpendicular to the plane.

7 Claims, 8 Drawing Sheets

(51) Int. Cl.
*B62J 35/00* (2006.01)
*B62J 37/00* (2006.01)
*B62K 11/06* (2006.01)
*F02M 37/00* (2006.01)
*F02M 37/10* (2006.01)

(52) U.S. Cl.
CPC ...... *F02M 37/007* (2013.01); *F02M 37/0017* (2013.01); *F02M 37/50* (2019.01); *F02M 37/0094* (2013.01); *F02M 37/103* (2013.01)

(58) Field of Classification Search
CPC . F02M 37/007; F02M 37/0094; F02M 37/103
See application file for complete search history.

(56) References Cited

U.S. PATENT DOCUMENTS

| | | | |
|---|---|---|---|
| 6,213,514 B1* | 4/2001 | Natsume | B62J 35/00 280/833 |
| 7,252,170 B2* | 8/2007 | Miyakozawa | B62J 35/00 180/219 |
| 7,484,766 B2* | 2/2009 | Iwasaki | B62J 35/00 180/219 |
| 7,681,920 B2* | 3/2010 | Iwasaki | B62J 35/00 180/219 |
| 7,712,564 B2* | 5/2010 | Schmidt | B62J 35/00 180/219 |
| 7,997,622 B2* | 8/2011 | Yamada | B62J 35/00 280/833 |
| 8,307,811 B2* | 11/2012 | Tokunaga | B62J 35/00 123/509 |
| 9,126,648 B2* | 9/2015 | Nishimura | B62J 35/00 |
| 9,150,268 B2 | 10/2015 | Inoue et al. | |
| 9,630,673 B2 | 4/2017 | Kono | |
| 2012/0074139 A1* | 3/2012 | Hisadomi | B60K 15/04 220/200 |
| 2013/0008899 A1* | 1/2013 | Hisadomi | B60K 15/03 220/86.2 |
| 2013/0105234 A1* | 5/2013 | Nishimura | B62J 35/00 180/69.4 |
| 2015/0083511 A1 | 3/2015 | Kono | |
| 2015/0090512 A1 | 4/2015 | Inoue et al. | |
| 2016/0090140 A1* | 3/2016 | Mizukura | B62K 11/04 180/219 |

FOREIGN PATENT DOCUMENTS

JP 2015-67232 A 4/2015
WO WO 2013/179501 A1 12/2013

* cited by examiner

FUEL TANK FOR SADDLED VEHICLE

CROSS-REFERENCE TO RELATED APPLICATIONS

The present application claims priority under 35 USC 119 to Japanese Patent Application No. 2016-156680 filed Aug. 9, 2016 the entire contents of which are hereby expressly incorporated by reference.

TECHNICAL FIELD

The present invention relates to a fuel tank for a saddled vehicle, especially, to a fuel tank for a saddled vehicle where an upper half body and a lower half body are formed by presswork to be joined.

BACKGROUND ART

Conventionally, there has been known a fuel tank disposed between a steering handlebar and a seat of a motorcycle as a saddled vehicle to be formed of a steel plate material (steel plate).

Patent Literature 1 discloses a fuel tank constituted of two parts split in a vertical direction. Usually, the fuel tank is formed such that press molding is performed on a steel plate punched out in a predetermined shape to form an upper half body and a lower half body, and end portions of both half bodies are welded together.

CITATION LIST

Patent Literature

Patent Document 1: WO2013/179501 A1

SUMMARY OF INVENTION

Technical Problem

Here, on a sports vehicle of a high grade model and a race-based vehicle, there is an attempt to constitute the fuel tank with a titanium plate material for further weight reduction. However, because of titanium having low Young's modulus compared with steel, a springback returning to an original shape after the press molding easily increases. The increase of the springback causes variation of a capacity of the fuel tank. Therefore, it is a problem that the upper half body and the lower half body require some devices on the shape.

It is an object of the present invention to solve the problems of the conventional technology and provide a fuel tank for a saddled vehicle where titanium material is applied to achieve weight reduction while providing high shape accuracy.

Solution to Problems

To achieve the afore-mentioned object, the present invention has a first feature in that the fuel tank (3) including an upper half body (30) and a lower half body (50), the upper half body (30) including a tubular member (32) arranged upright from a peripheral edge of a filler opening (32a), the lower half body (50) including an opening (66) into which a fuel pump (26) is inserted, the fuel tank (3) being formed of an upper half body flange (30a) and a lower half body flange (50a) joined together, the upper half body flange (30a) being disposed on a lower end portion of the upper half body (30), the lower half body flange (50a) being disposed on an upper end portion of the lower half body (50), wherein the upper half body flange (30a) is disposed over a whole circumference of the lower end portion along a single plane (H), the lower half body flange (50a) is disposed over a whole circumference of the upper end portion along the plane (H), the upper half body (30) and the lower half body (50) are made of titanium material, the upper half body flange (30a) and the lower half body flange (50a) have linear outer edges as straight line portions (T1 and T2) when viewed from above in a direction perpendicular to the plane (H), the upper half body (30) has a side surface (US), the lower half body (50) has a side surface (DS), and the side surface (US) and/or the side surface (DS) include at least one recess (51, 56, 36, and 37) and/or at least one convex portion (60, 61, and 62), and the recess (51, 56, 36, and 37) and/or the convex portion (60, 61, and 62) are disposed within a range of lengths of the straight line portions (T1 and T2) when viewed from above in the direction perpendicular to the plane (H).

The present invention has a second feature in that the recess (51 and 56) and the convex portion (60, 61, and 62) are disposed on the side surface (DS) in a vehicle width direction of the lower half body (50), the recess (51 and 56) and the convex portion (60, 61, and 62) form at least one vertical step portion (52 and 55) and at least one inclined step portion (53 and 57), the vertical step portion (52 and 55) extending in a direction perpendicular to the plane (H), the inclined step portion (53 and 57) inclining with respect to the vertical step portion (52 and 55), and the vertical step portion (52 and 55) and the inclined step portion (53 and 57) have shapes expanding to ends as away from the plane (H).

The present invention has a third feature in that the recess (51 and 56) serves as an engaging portion with a rubber member (28 and 29), the rubber member (28 and 29) being disposed on a body frame (2) to secure the fuel tank (3) to the body frame (2).

The present invention has a fourth feature in that the recess (36) is disposed on the side surface (US) in the vehicle body rear side of the upper half body (30) within the range of the length of the straight line portion (T2), and the recess (36) has a shape covering a front surface of an electronic component (P) disposed closely to the recess (36).

The present invention has a fifth feature in that the upper half body flange (30a) includes a first bent portion (34) on a vehicle body front side, the first bent portion (34) being bent downward of the vehicle body to abut on an edge of the lower half body flange (50a), and the lower half body flange (50a) includes a second bent portion (54) on a vehicle body rear side, the second bent portion (54) being bent upward of the vehicle body to abut on an edge of the upper half body flange (30a).

The present invention has a sixth feature in that the recess (37) is disposed on a position in a vehicle body rear side of the tubular member (32) on the side surface (US) in the vehicle width direction of the upper half body (30).

The present invention has a seventh feature in that the plane (H) is inclined downwardly toward the rear along a top surface of the body frame (2) in the vehicle body side view.

Advantageous Effects of Invention

According to the first feature, the upper half body flange (30a) is disposed over a whole circumference of the lower end portion along a single plane (H), the lower half body flange (50a) is disposed over a whole circumference of the upper end portion along the plane (H), the upper half body (30) and the lower half body (50) are made of titanium material, the upper half body flange (30a) and the lower half body flange (50a) have linear outer edges as straight line portions (T1 and T2) when viewed from above in a direction perpendicular to the plane (H), the upper half body (30) has a side surface (US), the lower half body (50) has a side surface (DS), and the side surface (US) and/or the side surface (DS) include at least one recess (51, 56, 36, and 37) and/or at least one convex portion (60, 61, and 62), and the recess (51, 56, 36, and 37) and/or the convex portion (60, 61, and 62) are disposed within a range of lengths of the straight line portions (T1 and T2) when viewed from above in the direction perpendicular to the plane (H). Therefore, disposing the plate-shaped flanges on the upper half body and the lower half body with the shapes left intact as before the press molding ensures reducing a springback after the press molding. Disposing the straight line portions on a part where the upper and lower flanges are superposed makes the welding operation for joining the upper half body and the lower half body easy. Furthermore, disposing the recesses and the convex portions on the side surfaces of the upper half body or the lower half body decreases a planar portion to reduce the springback while enhancing the rigidity of the fuel tank.

According to the second feature, the recess (51 and 56) and the convex portion (60, 61, and 62) are disposed on the side surface (DS) in a vehicle width direction of the lower half body (50), the recess (51 and 56) and the convex portion (60, 61, and 62) form at least one vertical step portion (52 and 55) and at least one inclined step portion (53 and 57), the vertical step portion (52 and 55) extending in a direction perpendicular to the plane (H), the inclined step portion (53 and 57) inclining with respect to the vertical step portion (52 and 55), and the vertical step portion (52 and 55) and the inclined step portion (53 and 57) have shapes expanding to ends as away from the plane (H). Therefore, disposing the recesses and the convex portions on the side surfaces in the vehicle width direction of the lower half body ensures enhancing the rigidity of the lower half body that receives weights of the fuel and the fuel pump. Some devices on the shapes of the recesses and the convex portions ensure improving a punching property at the press molding, and disposing a plurality of the recesses and the convex portions at proximities of the flanges ensures enhancing the rigidity of the flanges. Furthermore, width dimensions of the convex portions increasing as approaching the flanges reduce the decrease of the capacity of the fuel tank caused by disposing the recesses and the convex portions.

According to the third feature, the recess (51 and 56) serves as an engaging portion with a rubber member (28 and 29), the rubber member (28 and 29) being disposed on a body frame (2) to secure the fuel tank (3) to the body frame (2). Therefore, the rubber members engaging with the recesses achieve a rubber-mount of the fuel tank, and the recesses disposed on the lower half body serve as guides when the fuel tank is attached and removed, thus improving maintainability of the saddled vehicle.

According to the fourth feature, the recess (36) is disposed on the side surface (US) in the vehicle body rear side of the upper half body (30) within the range of the length of the straight line portion (T2), and the recess (36) has a shape covering a front surface of an electronic component (P) disposed closely to the recess (36). Therefore, the rigidity of the rear upper portion of the fuel tank is ensured while an interference with the electronic component is avoided.

According to the fifth feature, the upper half body flange (30a) includes a first bent portion (34) on a vehicle body front side, the first bent portion (34) being bent downward of the vehicle body to abut on an edge of the lower half body flange (50a), and the lower half body flange (50a) includes a second bent portion (54) on a vehicle body rear side, the second bent portion (54) being bent upward of the vehicle body to abut on an edge of the upper half body flange (30a). Therefore, the first bent portions and the second bent portions serve as positioning guides when joining the upper half body and the lower half body, thus making the assembly operation of the fuel tank easy. End surfaces of the upper half body flange and the lower half body flange are less exposed to ensure improving an appearance property of the fuel tank.

According to the sixth feature, the recess (37) is disposed on a position in a vehicle body rear side of the tubular member (32) on the side surface (US) in the vehicle width direction of the upper half body (30). Therefore, the rigidity of the fuel tank on the vehicle body rear side of the filler opening can be enhanced.

According to the seventh feature, the plane (H) is inclined downwardly toward the rear along a top surface of the body frame (2) in the vehicle body side view. Therefore, the fuel tank can be stably supported with respect to the body frame inclined downwardly to the rear.

DESCRIPTION OF EMBODIMENTS

Figure 1:
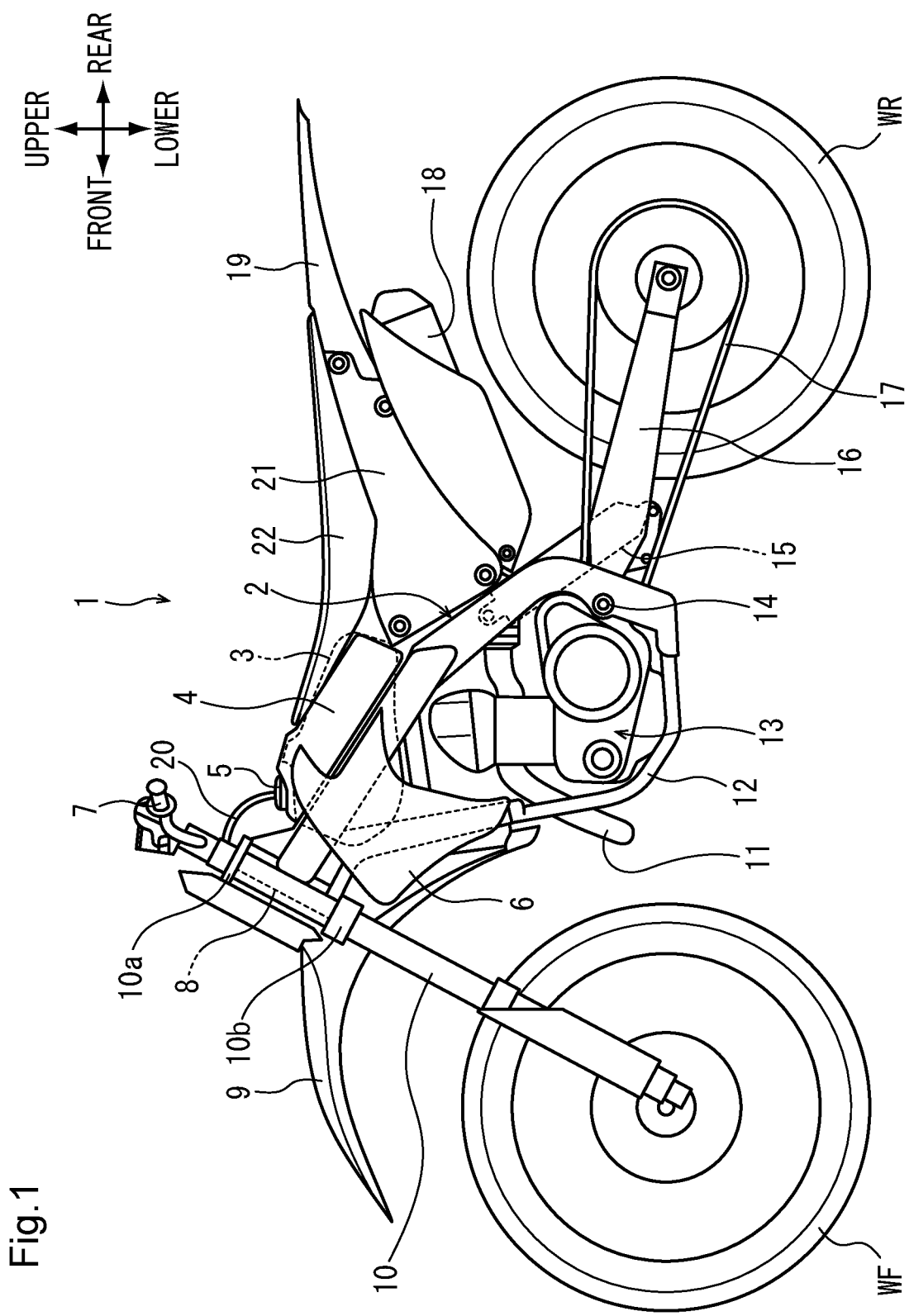
FIG. 1 is a left side view illustrating a motorcycle to which a fuel tank for a saddled vehicle according to the embodiment is applied.

The following describes a preferred embodiment according to the present invention in detail with reference to the drawings. FIG. 1 is a left side view illustrating a motorcycle 1 to which a fuel tank 3 for a saddled vehicle according to the embodiment is applied. The motorcycle 1 is an off-road type saddled vehicle where a driving force of an engine 13 as a power source is transmitted to a rear wheel WR via a drive chain 17.

A body frame 2 has a vehicle body front end where a head tube 8 is disposed to swingably journal a steering stem (not illustrated). A pair of right and left front forks 10 rotatably journal a front wheel WF are supported by a top bridge 10a and a bottom bridge 10b which are secured to the steering stem at upper and lower sides of the head tube 8. The bottom bridge 10b has a vehicle body front side where a front fender 9 is disposed.

The engine 13 is suspended so as to be surrounded between an under frame 12 and the body frame 2 on a lower side of the body frame 2. The engine 13 includes an exhaust port to which an exhaust pipe 11 is coupled, and the exhaust pipe 11 is coupled to a muffler 18 on a vehicle body rear side. The body frame 2 has a rear end lower portion where a pivot 14 is disposed to swingably journal a front end portion of a swing arm 16. The swing arm 16 which rotatably journals the rear wheel WR, has a front side suspended on the body frame 2 by a rear cushion 15 via a link mechanism.

The fuel tank 3 secured to the body frame 2 is disposed between a steering handlebar 7 and a seat 22. A side cowl 21 is arranged underneath the seat 22, and a rear fender 19 is arranged at the rear of the seat 22.

The fuel tank 3 has a top covered with a resin fuel tank cover 4, and the fuel tank 3 has a front top where a fuel cap 5 with a breather hose 20 is installed. Radiator shrouds 6 cover the right and left body frames 2 on a rear lower part of the head tube 8, and have parts extending to right and left sides of the fuel tank 3. A configuration may be employed such that the fuel tank 3 has the top exposed outward instead of disposing the fuel tank cover 4.

Figure 2:
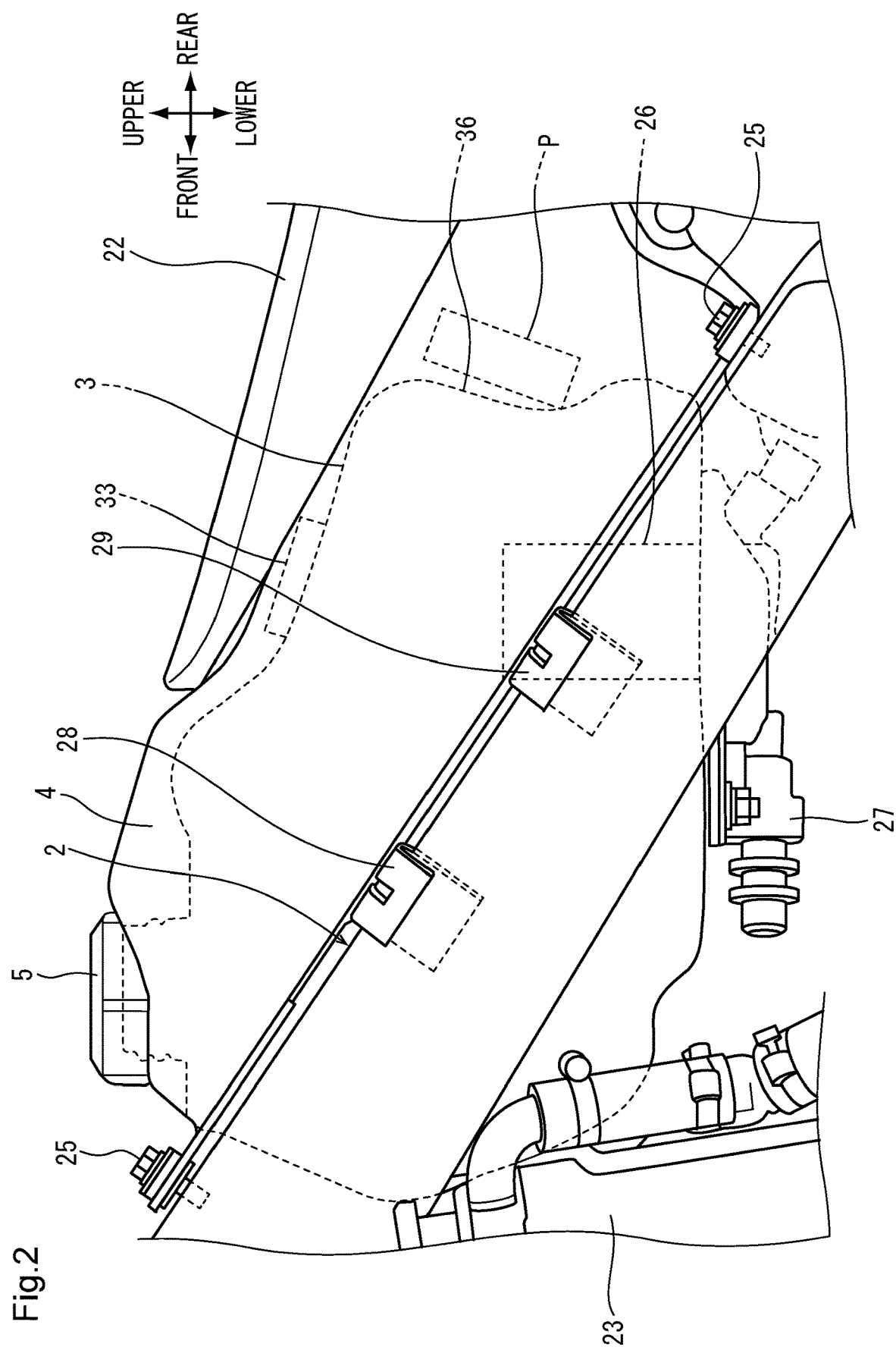
FIG. 2 is a side view illustrating an enlarged periphery of the fuel tank.

FIG. 2 is a side view illustrating an enlarged periphery of the fuel tank 3. The view illustrates a state where the radiator shrouds 6 are removed, and the radiator shrouds 6 cover the right and left sides of a radiator 23. The fuel tank 3 is arranged so as to be sandwiched between the pair of right and left body frames 2. The body frame 2 includes two rubber members 28 and 29 that are engaged with recesses formed on side surfaces in a vehicle width direction of the fuel tank 3 to achieve a rubber-mount structure, and functions as a positioning member in assembling the fuel tank 3. The rubber members 28 and 29 have a shape where a thin plate member is bent according to an upper end shape of the body frame 2, and are secured to the body frame 2 by a tie-wrap (not illustrated). The fuel tank 3 is secured to the body frame 2 by bolts 25 on positions of a vehicle body front side end and a vehicle body rear side end.

The fuel tank 3 has a bottom portion on which a fuel pump 26 is installed to pressure-feed fuel, and the fuel is transmitted to a fuel injection unit from a discharge nozzle 27. The top of the fuel tank 3 has a shape inclined downwardly to the rear according to the shape of the seat 22, and a top surface of the fuel tank 3 includes a stay supporting portion 33 with which a positioning stay (not illustrated) disposed on a lower surface of the seat 22 engages. The stay supporting portion 33 is joined to the upper half body 30 by TIG welding. The upper half body 30 has a vehicle body rear side surface on which a recess 36 is disposed. At the rear of the recess 36, an electronic component P is closely disposed, and the recess 36 has a shape covering a front surface of the electronic component P.

Figure 3:
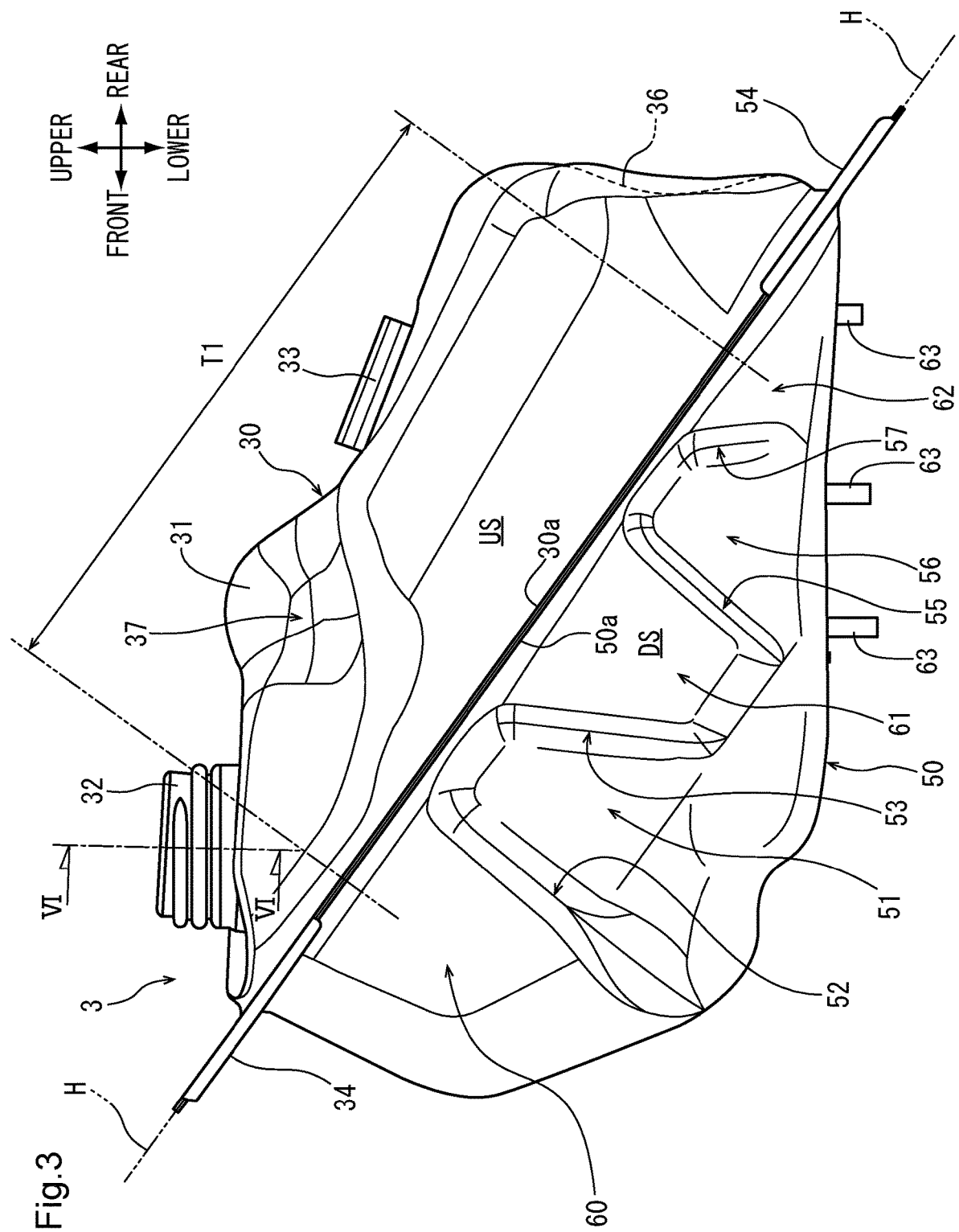
FIG. 3 is a left side view of the fuel tank.
Figure 4:
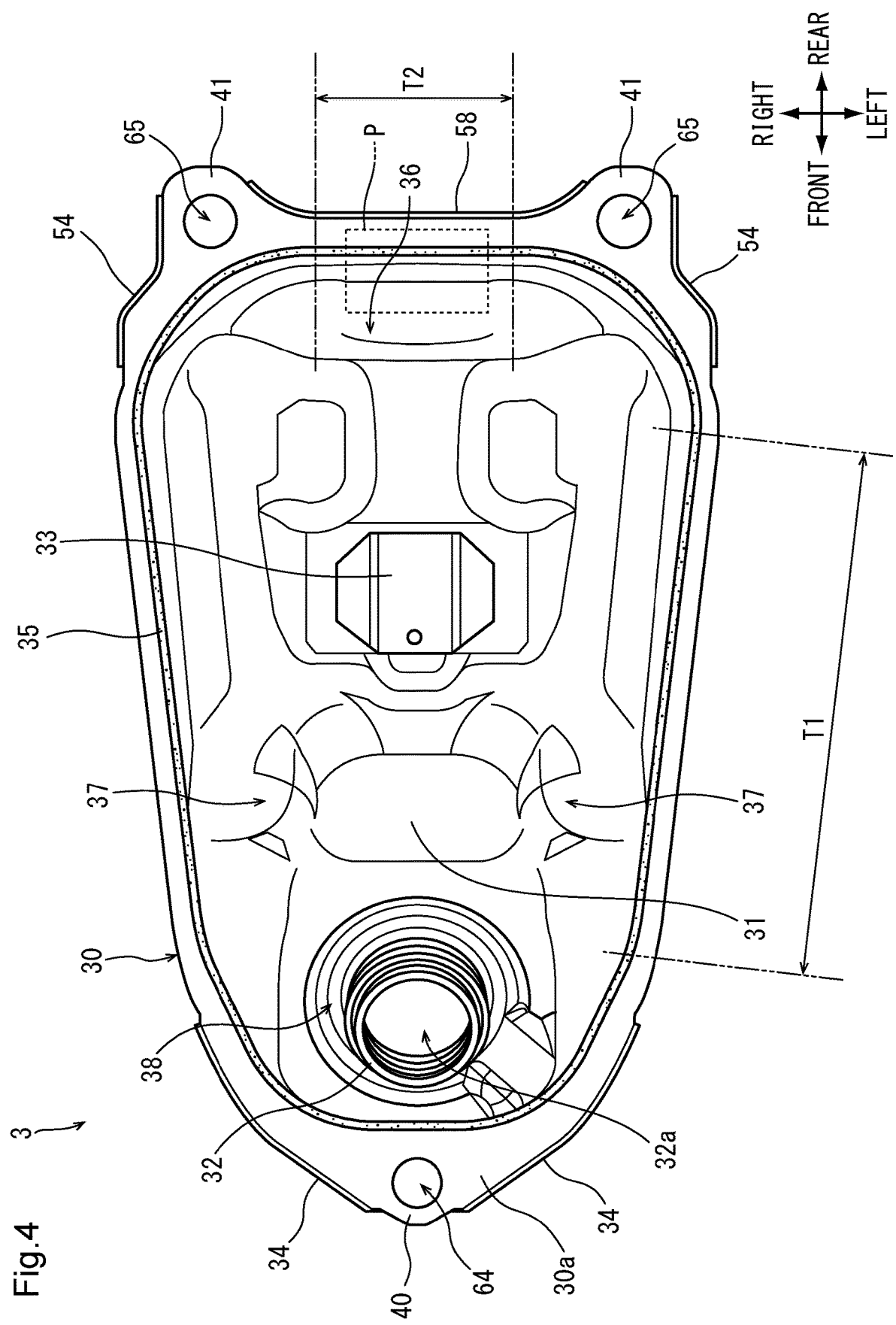
FIG. 4 is a top view of the fuel tank viewed from a direction perpendicular to a plane H.
Figure 5:
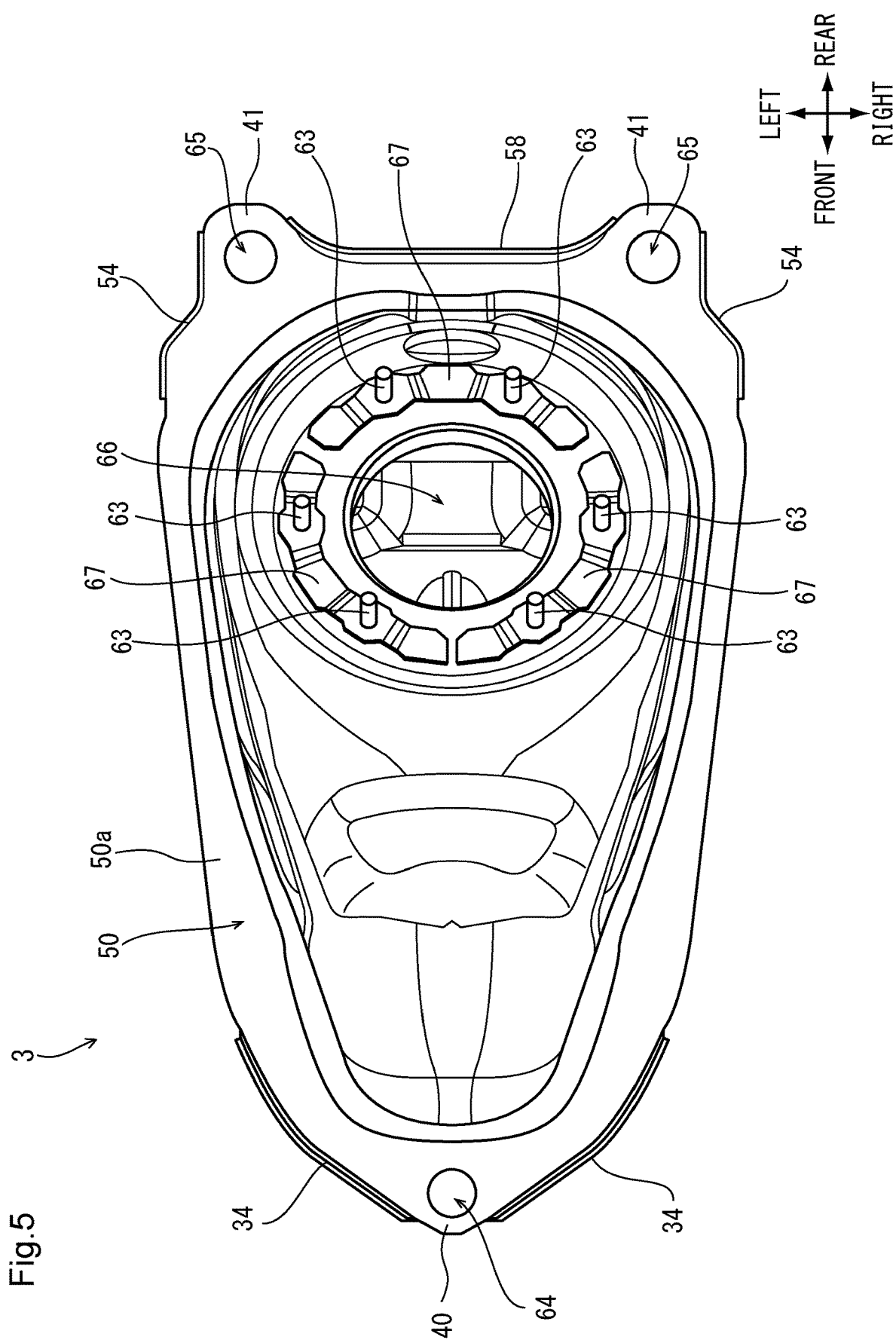
FIG. 5 is a bottom view of the fuel tank viewed from the direction perpendicular to the plane H.

FIG. 3 is a left side view of the fuel tank 3. FIG. 4 is a top view of the fuel tank 3 viewed from a direction perpendicular to a plane H inclined downwardly to the rear as viewed in the side view of the vehicle body. FIG. 5 is a bottom view of the fuel tank 3 viewed from the direction perpendicular to the plane H.

The fuel tank 3 is formed of the upper half body 30 and the lower half body 50 which are made of titanium material, joined by welding. The upper half body 30 and the lower half body 50 are provided by performing a drawing on a titanium plate material punched out in a predetermined shape with a pressing machine. The upper half body 30 has a side surface US continuous with the top surface and a peripheral area of the top surface. The lower half body 50 has a side surface DS continuous with the bottom surface and a peripheral area of the bottom surface.

The upper half body 30 has a lower end portion whose peripheral edge includes an upper half body flange 30a along the plane H. The lower half body 50 has an upper end portion whose peripheral edge includes a lower half body flange 50a along the plane H. The upper half body flange 30a and the lower half body flange 50a, whose peripheral edge shapes are identical to one another, are portions where a flat shape before the press molding is left intact. This ensures reducing a springback after the press molding. The upper half body 30 and the lower half body 50 are joined together by resistance welding on a welding portion 35 (hatched part in FIG. 4) lying closer to the inside of the upper half body flange 30a and the lower half body flange 50a.

The upper half body 30 has a front upper portion that includes a tubular member 32 arranged upright from a peripheral edge portion of a filler opening 32a to be screwed with the fuel cap 5. On the upper half body 30 nearby the tubular member 32, an annular recess 38 is disposed to receive the fuel overflowed when refueling. On a position at the rear of the tubular member 32 on a center in a vehicle width direction, a protruding portion 31 is disposed to rise upward, and on the right and left of the protruding portion 31 in the vehicle width direction, recesses 37 are disposed to enhance rigidity of the upper half body 30.

On the side surfaces DS of the lower half body 50 on the right and left sides in the vehicle width direction, large-sized recesses 51 and 56 are disposed. This relatively forms three convex portions 60, 61, and 62 at the front and rear of the recesses 51 and 56, thus enhancing rigidity of the lower half body 50 that receives weights of the fuel and the fuel pump 26.

The recesses 51 and 56 and the convex portions 60, 61, and 62 form vertical step portions 52 and 55 extending vertically to the plane H and inclined step portions 53 and 57 inclined with respect to the vertical step portions 52 and 55. Then, the vertical step portions 52 and 55 and the inclined step portions 53 and 57 have shapes expanding to the end as away from the plane H. This allows some devices on the shapes of the recesses and the convex portions to improve a punching property at the press molding, and reduces decrease of the capacity of the fuel tank 3 caused by disposing the recesses and the convex portions to minimum because width dimensions of the convex portions 60, 61, and 62 increase as approaching the half body flanges.

With reference to FIG. 4, in the top view in the vertical direction to the plane H, the upper half body flange 30a and the lower half body flange 50a have shapes expanding toward the rear of the vehicle body according to the shape of the body frame 2. The upper half body flange 30a and the lower half body flange 50a include linear outer edges as straight line portions T1 on the right and left sides in the vehicle width direction, and a straight line portion T2 on the vehicle body rear side. Disposing the straight line portions T1 and T2 on a part where the upper and lower half body flanges are superposed makes the welding operation of the upper half body 30 and the lower half body 50 easy.

The above-described convex portions 60, 61 and 62, and the recesses 51 and 56 are each disposed within ranges of the straight line portions T1. This ensures enhancing the rigidity of the fuel tank 3 while the convex portions, and the recesses are concentrated in a narrow range and a planar portion is decreased so as to reduce the springback.

Furthermore, the recesses 51 and 56 are engaging portions with the rubber members 28 and 29 disposed on the body frame 2, and the vertical step portions 52 and 55 and the inclined step portions 53 and 57 which have the shapes expanding to the end as away from the plane H, serve as guides when the fuel tank 3 is installed on the body frame 2, thus improving maintainability of the motorcycle 1.

As described above, on the side surface US of the upper half body 30 at the vehicle body rear side, the recess 36 is disposed within a range of the length of the straight line portion T2. At the rear of the recess 36, the electronic component P is closely disposed, and the recess 36 has the shape covering the front surface of the electronic component P. This ensures avoiding an interference with the electronic component P, while the rigidity of the rear upper portion of the fuel tank 3 is ensured.

The vehicle body front side ends and the vehicle body rear side ends of the upper half body flange 30a and the lower half body flange 50a are each secured to the body frame 2 by the bolts 25. The vehicle body front side ends of the upper half body flange 30a and the lower half body flange 50a include a protruding portion 40 protruding to the vehicle body front side and a through-hole 64 on the center in the vehicle width direction, and the vehicle body rear side ends include protruding portions 41 protruding to the vehicle body rear side and through-holes 65 on the right and left sides in the vehicle width direction.

On the vehicle body front side of the upper half body flange 30a, first bent portions 34 are provided as a pair at the right and left while being bent downward of the vehicle body to abut on an edge of the lower half body flange 50a. On the other hand, on the vehicle body rear outer sides of the lower half body flange 50a, second bent portions 54 are provided as a pair at the right and left while being bent upward of the vehicle body to abut on an edge of the upper half body flange 30a. Furthermore, on the vehicle body rear end of the lower half body flange 50a, a third bent portion 58 is disposed while being bent downward of the vehicle body to abut on the edge of the upper half body flange 30a.

Then, the first bent portions 34, the second bent portions 54, and the third bent portion 58 serve as positioning guides when joining the upper half body 30 and the lower half body 50, thus making the assembly operation of the fuel tank 3 easy. End surfaces of the upper half body flange 30a and the lower half body flange 50a are less exposed to ensure improving an appearance property of the fuel tank 3.

On the bottom portion of the lower half body 50, an opening 66 into which the fuel pump 26 is inserted is disposed closer to the vehicle body rear side. To a peripheral area of the opening 66, fuel pump stays 67 are secured including screw portions 63 for supporting the fuel pump 26. Forming the fuel pump stay 67 is facilitated by dividing the fuel pump stay 67 into three parts instead of forming in an annular shape, and usage of titanium material is reduced, thus the fuel pump stay 67 is joined to the lower half body 50 by spot welding and TIG tanning welding without a welding rod.

Figure 6:
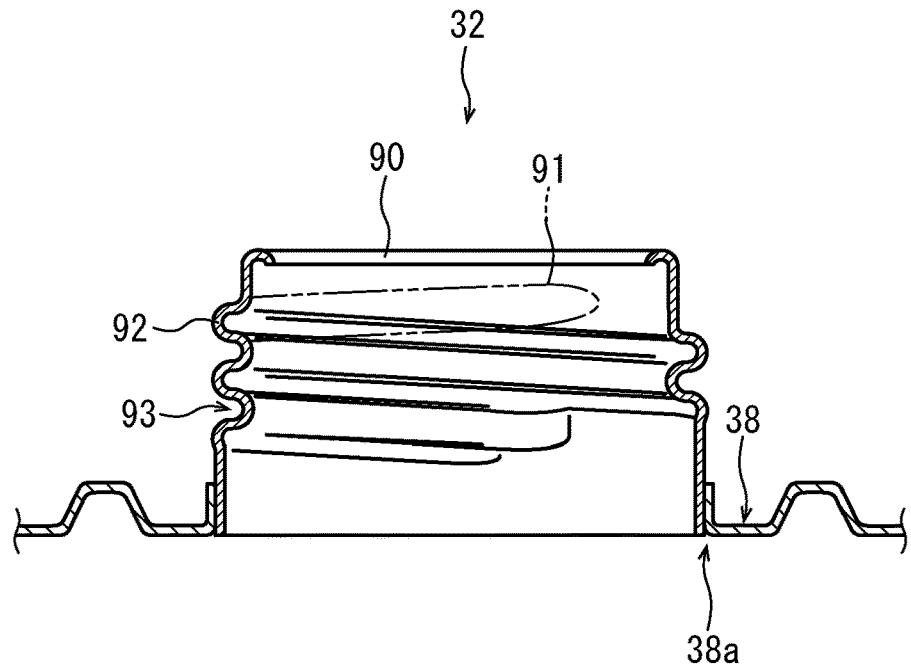
FIG. 6 is a cross-sectional view taken along line VI-VI in FIG. 3.

FIG. 6 is a cross-sectional view taken along line VI-VI in FIG. 3. The tubular member 32 which is formed of titanium material to be joined to the upper half body 30, has a configuration where an external thread portion 91 is disposed on a side surface of the tubular member 32 and a folded portion 90 is disposed on a vehicle body upper side end. The external thread portion 91 includes a peak 92 and a bottom 93 each having an arc-shaped cross section with a relatively small curvature, thus facilitating forming the external thread portion 91. A lower end edge of the tubular member 32 and an edge of the annular recess 38 are joined together at a joint 38a by performing the TIG tanning welding from an outer peripheral side of the tubular member 32. The upper half body 30 has a plate thickness of 0.7 mm as an optimal value, and each portion has the plate thickness configured in a range of 0.5 to 0.9 min corresponding to the presswork. The tubular member 32 has a plate thickness of 1.0 mm as an optimal value, and each portion has the plate thickness configured in a range of 0.8 to 1.2 mm corresponding to the presswork, so as to ensure the rigidity corresponding to screwing of the fuel cap 5 by overall forming thicker compared with the upper half body 30. Furthermore, the joint 38a is formed to be thicker than the plate thickness of the upper half body 30 to increase the rigidity, thus preventing deformation of the tubular member 32 and a periphery of the tubular member 32 due to the springback.

Figure 7:
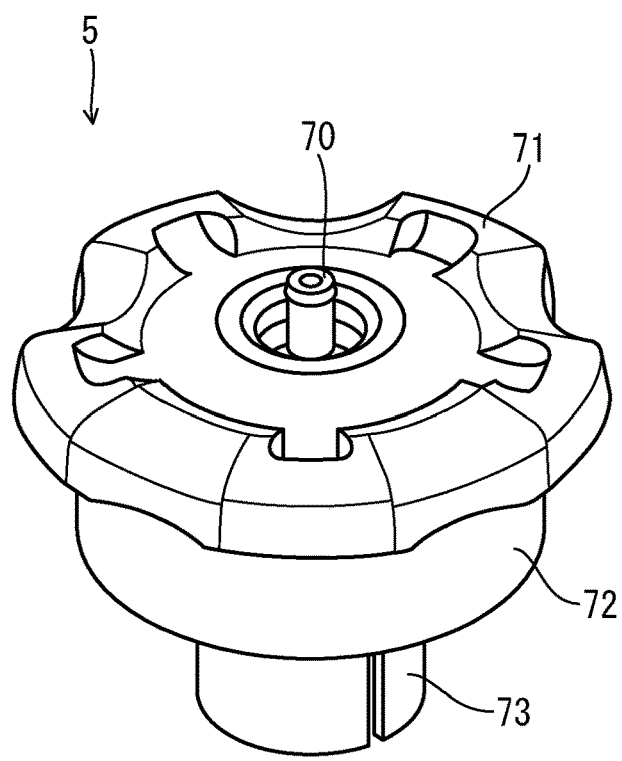
FIG. 7 is a perspective view of a fuel cap.
Figure 8:
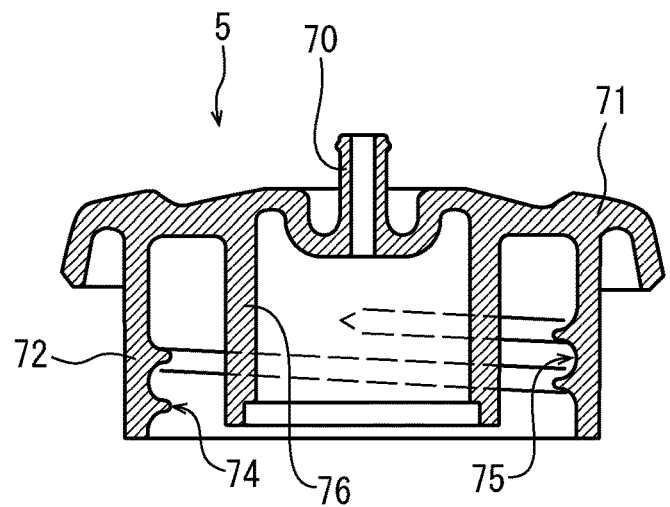
FIG. 8 is a cross-sectional view of the fuel cap.

FIG. 7 is a perspective view of the fuel cap 5. FIG. 8 is a cross-sectional view of the fuel cap 5. The fuel cap 5 is made of, for example, a synthetic resin, and the fuel cap 5 has a configuration where a main body 72 with a grip 71 has an inner tubular portion 76 to which an extending member 73 is installed. On an upper portion of the center of the fuel cap 5, an installation pipe 70 for the breather hose 20 is disposed.

The main body 72 has an inner peripheral portion on which an internal thread portion is disposed, and the internal thread portion is configured of an arc-shaped peak 74 with a large curvature and an arc-shaped bottom 75 with a small curvature corresponding to the external thread portion 34 of the tubular member 32 having the arc-shaped cross section.

Figure 9:
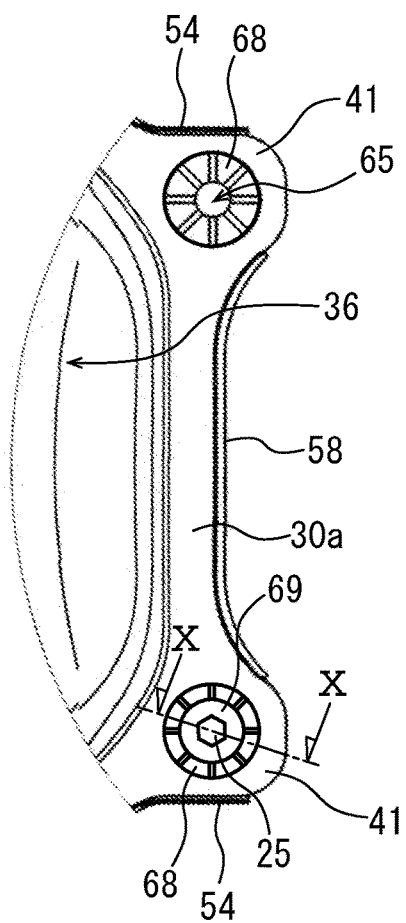
FIG. 9 is a plan view illustrating an enlarged rear end portion of the fuel tank.
Figure 10:
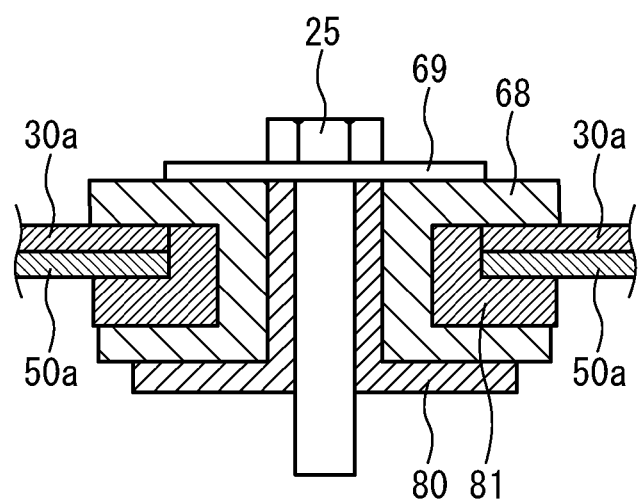
FIG. 10 is a cross-sectional view taken along line X-X in FIG. 9.

FIG. 9 is a plan view illustrating an enlarged rear end portion of the fuel tank 3. FIG. 10 is a cross-sectional view taken along line X-X in FIG. 9. For securing the fuel tank 3 to the body frame 2 by the bolts 25, grommets 68 made of rubber or similar material are engaged with the through-holes 64 and 65. Furthermore, a stainless steel collar 81, where a step is disposed corresponding to the thickness of the upper half body flange 30a and the lower half body flange 50a, is inserted so as to prevent the end surfaces of the upper half body flange 30a and the lower half body flange 50a from abutting on a cylindrically-shaped side surface of the grommet 68. The collar 81 increases the area contacting the cylindrically-shaped side surface of the grommet 68 to improve durability of the grommet 68, and eliminates the need for the welding to the upper and lower half body flanges to reduce the production cost.

Then, the grommet 68 has the through-hole into which a collar 80 is inserted from the lower side to prevent the grommet 68 from being collapsed when the bolt 25 is fastened. The bolt 25 is inserted into the through-hole from the upper side across a washer 69 abutting on the top surface of the grommet 68, thus fastened to the body frame 2.

With the above configuration, according to the fuel tank 3 for the saddled vehicle according to the embodiment, the upper half body flange 30a is disposed over a whole circumference of the lower end portion along the single plane H, and the lower half body flange 50a is disposed over a whole circumference of the upper end portion along the plane H. The upper half body 30 and the lower half body 50 are made of titanium material, and the upper half body flange 30a and the lower half body flange 50a have linear outer edges as the straight line portions T1 and T2 when viewed from above in a direction perpendicular to the plane H. The upper half body 30 has the side surface US, the lower half body 50 has the side surface DS, and the side surface US and the side surface DS include the recesses 51, 56, 36, and 37 and the convex portions 60, 61, and 62. The recesses 51, 56, 36, and 37 and the convex portions 60, 61, and 62 are disposed within a range of lengths of the straight line portions T1 and T2 when viewed from above in the direction perpendicular to the plane H. Accordingly, disposing the plate-shaped upper half body flange and the lower half body flange on the upper half body and the lower half body with the shapes left intact as before the press molding ensures reducing a springback after the press molding. Disposing the straight line portions on a part where the upper half body flange and the lower half body flange are superposed makes the welding operation for joining the upper half body and the lower half body easy. Furthermore, disposing the recesses and the convex portions on the side surfaces of the upper half body and the lower half body decreases a planar portion to reduce the springback while enhancing the rigidity of the fuel tank 3.

The shapes of the upper half body and the lower half body, the number and the shapes of the recesses and the convex portions, the shapes of the upper half body flange and the lower half body flange, the lengths and the locations of the straight line portions, and similar factors are not limited to the above embodiment, and various modifications are possible. The fuel tank for the saddled vehicle according to the present invention is applicable to various vehicles such as a saddled three/four-wheeled vehicle not limited to the motorcycle.

REFERENCE SIGNS LIST

1 . . . motorcycle,
2 . . . body frame,
3 . . . fuel tank,
5 . . . fuel cap,
26 . . . fuel pump,
28, 29 . . . rubber member,
30 . . . upper half body,
30a . . . upper half body flange,
50 . . . lower half body,
50a . . . lower half body flange,
54 . . . second bent portions,
51, 56, 36, 37 . . . recess,
60, 61, 62 convex portion,
52, 55 . . . vertical step portion,
53, 57 . . . inclined step portion,
T1, T2 . . . straight line portion,
H . . . plane

What is claimed is:

1. A fuel tank for a saddled vehicle, the fuel tank including an upper half body and a lower half body, the upper half body including a tubular member arranged upright from a peripheral edge of a filler opening, the lower half body including an opening into which a fuel pump is inserted, the fuel tank being formed of an upper half body flange and a lower half body flange joined together, the upper half body flange being disposed on a lower end portion of the upper half body, the lower half body flange being disposed on an upper end portion of the lower half body,
wherein the upper half body flange is disposed over a whole circumference of the lower end portion along a single plane,
the lower half body flange is disposed over a whole circumference of the upper end portion along the plane,
the upper half body and the lower half body are made of titanium material,
the upper half body flange and the lower half body flange have linear outer edges as straight line portions when viewed from above in a direction perpendicular to the plane,
a side surface of the upper half body and/or a side surface of the lower half body include at least one recess and/or at least one convex portion,
the recess and/or the convex portion are entirely disposed within lengths of the straight line portions when viewed from above in the direction perpendicular to the plane,
the recess and/or the convex portion are disposed on the side surface in a vehicle width direction of the lower half body,
the recess and/or the convex portion form at least one vertical step portion and at least one inclined step portion, the vertical step portion extending in a direction perpendicular to the plane, the inclined step portion inclining with respect to the vertical step portion, and
the vertical step portion and the inclined step portion have shapes expanding to ends as away from the plane.

2. The fuel tank for the saddled vehicle according to claim 1, wherein the recess serves as an engaging portion with a rubber member, the rubber member being disposed on a body frame to secure the fuel tank to the body frame.

3. The fuel tank for the saddled vehicle according to claim 2,
wherein the upper half body flange includes a first bent portion on a vehicle body front side, the first bent portion being bent downward of the vehicle body to abut on an edge of the lower half body flange, and
the lower half body flange includes a second bent portion on a vehicle body rear side, the second bent portion being bent upward of the vehicle body to abut on an edge of the upper half body flange.

4. The fuel tank for the saddled vehicle according to claim 2, wherein the plane is inclined downwardly toward the rear along a top surface of the body frame in the vehicle body side view.

5. The fuel tank for the saddled vehicle according to claim 1,
wherein the upper half body flange includes a first bent portion on a vehicle body front side, the first bent portion being bent downward of the vehicle body to abut on an edge of the lower half body flange, and
the lower half body flange includes a second bent portion on a vehicle body rear side, the second bent portion being bent upward of the vehicle body to abut on an edge of the upper half body flange.

6. A fuel tank for a saddled vehicle, the fuel tank including an upper half body and a lower half body, the upper half body including a tubular member arranged upright from a peripheral edge of a filler opening, the lower half body including an opening into which a fuel pump is inserted, the fuel tank being formed of an upper half body flange and a lower half body flange joined together, the upper half body flange being disposed on a lower end portion of the upper half body, the lower half body flange being disposed on an upper end portion of the lower half body,
wherein the upper half body flange is disposed over a whole circumference of the lower end portion along a single plane,
the lower half body flange is disposed over a whole circumference of the upper end portion along the plane,
the upper half body and the lower half body are made of titanium material,
the upper half body flange and the lower half body flange have linear outer edges as straight line portions when viewed from above in a direction perpendicular to the plane,
a side surface of the upper half body and/or a side surface of the lower half body include at least one recess and/or at least one convex portion, the recess and/or the convex portion are entirely disposed within lengths of the straight line portions when viewed from above in the direction perpendicular to the plane, the recess is disposed on the side surface in the vehicle body rear side of the upper half body within the range of the length of the straight line portion, and the recess has a shape covering a front surface of an electronic component.

7. The fuel tank for the saddled vehicle according to claim 6, wherein the upper half body flange includes a first bent portion on a vehicle body front side, the first bent portion being bent downward of the vehicle body to abut on an edge of the lower half body flange, and the lower half body flange includes a second bent portion on a vehicle body rear side, the second bent portion being bent upward of the vehicle body to abut on an edge of the upper half body flange.

* * * * *